United States Patent
Augustinowicz

(10) Patent No.: US 9,594,934 B2
(45) Date of Patent: *Mar. 14, 2017

(54) RFID REMOTE ANTENNA SECURITY SYSTEM

(71) Applicant: Identity Stronghold, LLC, Englewood, FL (US)

(72) Inventor: Walter P. Augustinowicz, Englewood, FL (US)

(73) Assignee: Identity Stronghold, LLC, Englewood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,385

(22) Filed: Aug. 10, 2015

(65) Prior Publication Data

US 2016/0042208 A1    Feb. 11, 2016

Related U.S. Application Data

(60) Provisional application No. 62/034,861, filed on Aug. 8, 2014.

(51) Int. Cl.
*G06K 7/10* (2006.01)
*G06K 19/07* (2006.01)
(Continued)

(52) U.S. Cl.
CPC ... *G06K 7/10257* (2013.01); *G06K 19/07345* (2013.01); *G06K 19/07739* (2013.01);
(Continued)

(58) Field of Classification Search
CPC .... H04W 12/04; H04W 92/18; H04L 63/061; G06K 19/077; G06K 19/07741;
(Continued)

(56) References Cited

U.S. PATENT DOCUMENTS 6,634,564 B2    10/2003  Kuramochi
7,137,563 B2    11/2006  Shibamoto
(Continued)

FOREIGN PATENT DOCUMENTS

| JP | 2003099742 | 4/2003 |
|---|---|---|
| WO | WO2004036495 | 4/2004 |
| WO | WO2010108022 | 9/2010 |

OTHER PUBLICATIONS

PCT International Search Report and Written Opinion for PCT/US2015/044490 from Korean Intellectual Property Office; Received and Printed Nov. 16, 2015.
(Continued)

*Primary Examiner* — Ali Neyzari
(74) *Attorney, Agent, or Firm* — Neustel Law Offices; Michael S. Neustel

(57) ABSTRACT

A remote antenna security system for preventing unauthorized reading of RFID cards. The RFID remote antenna security system generally includes at least one remote contact in communication with a remote antenna. A carrier member is provided that includes at least one contact and a tag that is in communication with the at least one contact. When the contact of the carrier member is physically connected to the remote contact of the remote unit, the radio waves received by the remote antenna are communicated to the tag and the tag transmits radio waves including data from the remote antenna for reading by the reader.

20 Claims, 11 Drawing Sheets

(51) Int. Cl.
  *G06K 19/073* (2006.01)
  *H04K 3/00* (2006.01)
  *G06K 19/077* (2006.01)

(52) U.S. Cl.
  CPC ......... *G06K 19/07741* (2013.01); *H04K 3/00* (2013.01); *G06K 19/0775* (2013.01); *G06K 19/07754* (2013.01)

(58) Field of Classification Search
  CPC ....... G06K 19/07345; G06K 19/07739; G06K 19/07754; G06K 7/06; G06K 19/06; G06K 7/00; G06K 19/00; G06K 7/10257; H04K 3/00
  USPC .............. 340/572.1, 10.1; 235/441; 455/41.3
  See application file for complete search history.

(56) References Cited

U.S. PATENT DOCUMENTS

| | | |
|---|---|---|
| 7,319,398 B2 | 1/2008 | Marino |
| 7,667,652 B2 | 2/2010 | Gevargiz |
| 7,830,322 B1 | 11/2010 | Oliver |
| 8,544,743 B2 * | 10/2013 | Hong ................... G06K 7/0082 235/441 |
| 8,698,630 B2 * | 4/2014 | Augustinowicz ........................ G06K 19/07345 340/572.1 |
| 2004/0129785 A1 | 7/2004 | Luu |
| 2005/0189425 A1 | 9/2005 | Itou |
| 2005/0192053 A1 | 9/2005 | Kao |
| 2006/0197213 A1 | 9/2006 | Lian |
| 2007/0289775 A1 | 12/2007 | Potts |
| 2008/0101273 A1 | 5/2008 | Everest |
| 2008/0308640 A1 | 12/2008 | Chien |
| 2009/0045960 A1 | 2/2009 | von Gutfeld |
| 2009/0159663 A1 | 6/2009 | Mullen |
| 2009/0166421 A1 | 7/2009 | Finn |
| 2009/0206994 A1 | 8/2009 | Lee |
| 2010/0156607 A1 | 6/2010 | Lankes |
| 2012/0043382 A1 | 2/2012 | Hong |
| 2013/0049963 A1 | 2/2013 | Augustinowicz |

OTHER PUBLICATIONS

PCT International Search Report, Received on Jan. 3, 2013.
European Search Report; Received on Mar. 19, 2015.

* cited by examiner

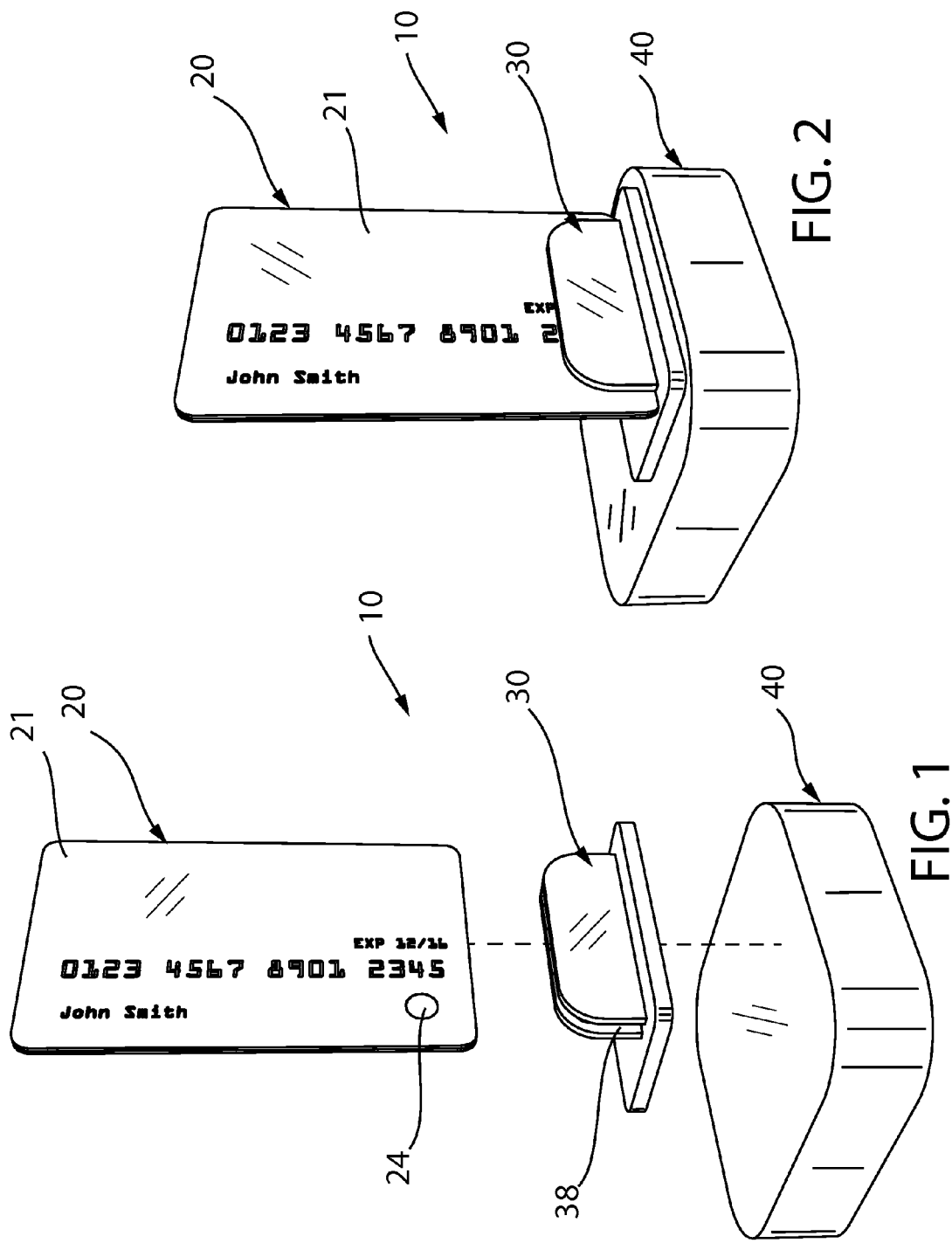

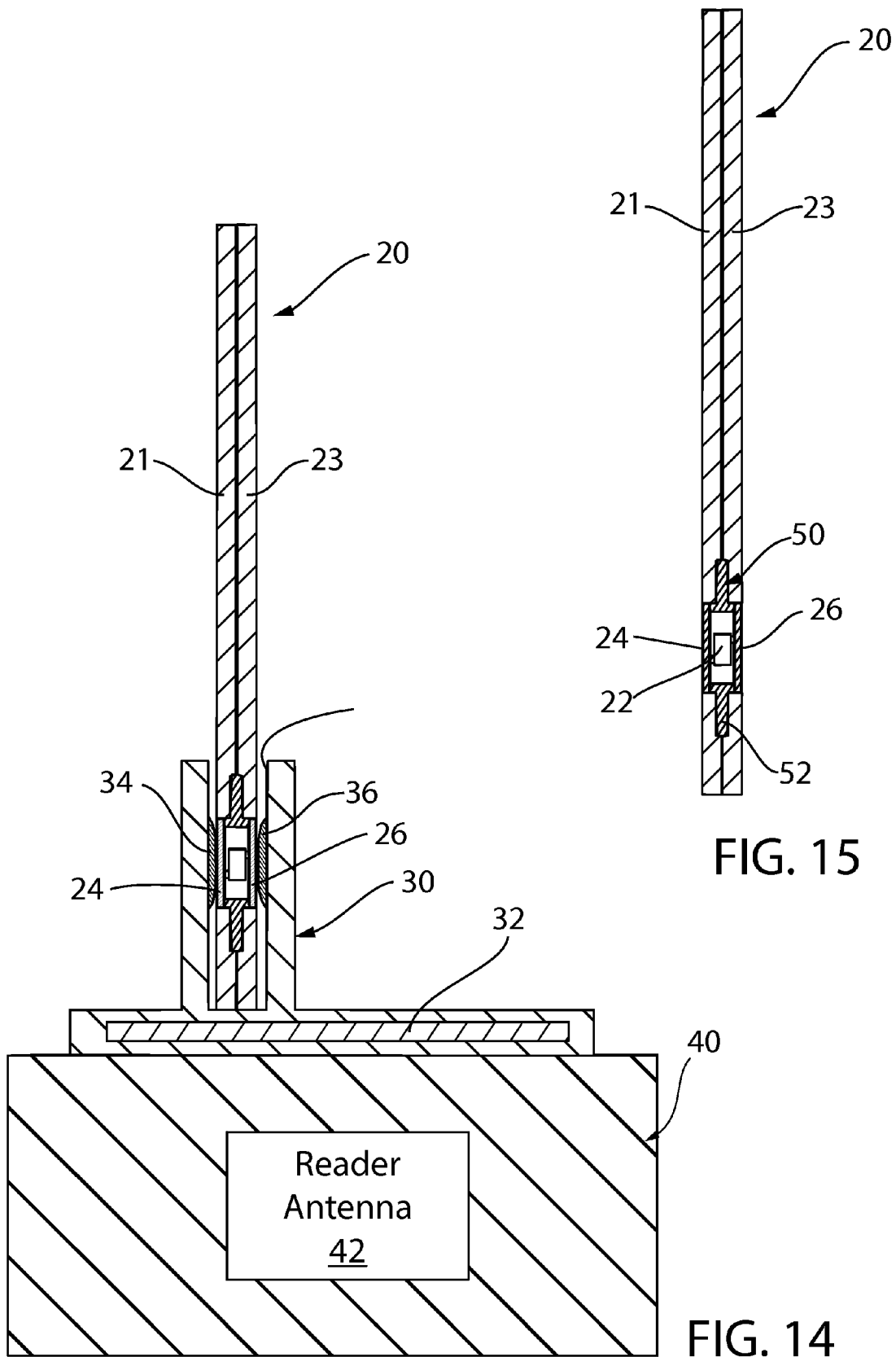

RFID REMOTE ANTENNA SECURITY SYSTEM

CROSS REFERENCE TO RELATED APPLICATIONS

I hereby claim benefit under Title 35, United States Code, Section 119(e) of U.S. provisional patent application Ser. No. 62/034,861 filed Aug. 8, 2014. The 62/034,861 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to RFID cards and more specifically it relates to an RFID remote antenna security system for preventing unauthorized reading of RFID cards.

Description of the Related Art

Any discussion of the related art throughout the specification should in no way be considered as an admission that such related art is widely known or forms part of common general knowledge in the field.

1. Wireless Devices and Readers.

Wireless communication technologies such as radio-frequency identification (RFID) and near field communication (NFC) utilize radio waves to wirelessly transfer data from a wireless device to a reader in a contactless manner.

There are various types of wireless devices in use today that utilize wireless communications such as RFID and NFC. Examples of wireless devices include but are not limited to proximity cards, passive cards, active cards, smart cards (with or without contacts), security cards, identification badges or identification cards, passports, payment devices, electronic devices and smartphones.

Smart cards are also sometimes referred to as chip cards or integrated circuit cards (ICC). Smart cards may or may not include contact pads for providing electrical connectivity with another device to provide a second path of communication in addition to wireless communication. Smart cards may not include contacts. Smart cards are useful for various types of applications including identification, authentication, data storage and application processing.

A reader may be comprised of various types of electronic devices adapted for receiving radio signals from wireless devices such as a passive reader or an active reader, wherein an active reader also transmits radio signals to be received by the wireless device.

2. Tags in Wireless Devices.

The wireless device includes a "tag" (a.k.a. transponder, RFID tag, RFID Chip, NFC tag, NFC chip) that stores data and wirelessly communicates with the reader via radio-frequency electromagnetic fields in either a unidirectional communication manner or a bi-directional communication manner. Tags may also be comprised of a read/write configuration that are programmable by the reader.

Tags typically communicate with readers via low frequency (LF), high frequency (HF) or ultra-high frequency (UHF) signals. For example, LF signals are typically in the 120 kHZ-150 kHz band (e.g. 125 kHz or 134 kHz for LF RFID tags), HF signals are typically in the 3 MHz-30 MHz band (e.g. 13.56 MHz for HF RFID tags) and UHF signals are typically in the 300 MHz-3 GHz band (e.g. 433 MHz for UFH RFID tags).

A tag is comprised of an integrated circuit and an antenna connected to the integrated circuit. An active tag includes a battery to provide electrical power and a passive tag includes a capacitor to store energy received from the radio signal of the reader. The tag may be comprised of various tag technologies such as an RFID tag (a.k.a. RFID chip) or an NFC tag (a.k.a. NFC chip).

The integrated circuit in the tag is for storing and processing information, modulating and demodulating a radio-frequency (RF) signal, collecting DC power from the reader signal and other functions. The integrated circuit includes memory to store various types of data (e.g. identification data, security access data, payment data). The integrated circuit also includes either a chip-wired logic or a programmed (or programmable) data processor for processing data received and to be sent.

The antenna in the tag is for receiving a radio signal from a reader and/or transmitting a radio signal to the reader. With a passive tag technology, the antenna also provides electrical power to the integrated circuit which does not include a battery via magnetic induction between the antenna and the reader located within each other's near field.

3. Types of RFID Technology.

There are three main types of RFID technology: active, semi-passive and passive. Active RFID tags utilize a battery to broadcast radio waves containing data. Semi-passive RFID tags utilize a smaller battery than active RFID tags to keep the RFID tag "awake" but still rely upon a reader to provide power for broadcasting radio waves. Passive RFID tags are completely reliant upon an external RFID reader to provide the power to broadcast radio waves containing the data. Active RFID tags can transmit radio waves that may be read at ranges of 300 feet or more. Passive RFID tags can transmit radio waves that may be read at ranges of 20 or more feet. Passive RFID tags are the most common RFID tag because of they are relatively inexpensive compared to active and semi-passive RFID tags.

Passive RFID tag systems have two main components: an RFID reader and an RFID tag. The RFID reader has a reader antenna that transmits radio waves that are received by an RFID antenna within the passive RFID tag. The radio waves received by the passive RFID tag are converted to electrical power and then used by the RFID tag to transmit radio waves containing data that are then detected by the RFID reader. The RFID reader then communicates the data received from the RFID tag via the radio waves to another device (e.g. computer) for processing.

4. Unauthorized Reading of Wireless Devices.

Unfortunately, RFID tags and NFC tags, particularly passive RFID tags, are susceptible to unauthorized reading (a.k.a. "skimming") where an unauthorized reader communicates with the tag by merely being in close proximity to the tag. Important data such as credit card data, identity data and personal data may be lost to unscrupulous individuals via the unauthorized reading of wireless devices such as RFID credit cards. To make matters worse for users, tags within the wireless devices do not need to be physically seen to transmit the data contained on the tag so a smart card in a wallet can still be scanned by an unauthorized reader.

5. Conventional Solutions to Prevent Unauthorized Reading.

Recently, various shielding products have been produced to block radio waves from being received by and/or transmitted to the tags in wireless devices. The shielding products typically use a layer of metal that blocks the radio waves and/or detunes the tag. Examples of security products include shielded sleeves, shielded badge holders, shielded wallets, shield bags and other devices that include an electromagnetic shield that prevents or significantly reduces the ability of the tag to communicate with a reader unless the wireless device is removed from the shielding device. U.S. Pat. No. 6,121,544 to Petsinger titled "Electromagnetic Shield to Prevent Surreptitious Access to Contactless Smartcards" illustrates a solution that utilizes an electromagnetic shield constructed of a magnetic alloy to shield a contactless smart card from electric field.

Because of the inherent problems with the related art, there is a need for a new and improved RFID remote antenna security system for preventing unauthorized reading of tags.

BRIEF SUMMARY OF THE INVENTION

The invention generally relates to an RFID card which includes a remote unit that is attached to or near a conventional RFID reader. The remote unit includes at least one remote contact in communication with a remote antenna. A carrier member is provided that includes at least one contact and an RFID chip that is in communication with the at least one contact. When the contact of the carrier member is physically connected to the remote contact of the remote unit, the radio waves received by the remote antenna are communicated to the RFID chip and the RFID chip transmits radio waves including data from the remote antenna for reading by the RFID reader.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is an exploded upper perspective view of the present invention.

FIG. 2 is an upper perspective view of the present invention with the carrier member inserted into the remote unit.

FIG. 14 is a side cutaway view of the carrier member inserted into the remote unit.

FIG. 15 is a side cutaway view of the carrier member.

DETAILED DESCRIPTION OF THE INVENTION

Figure 3:
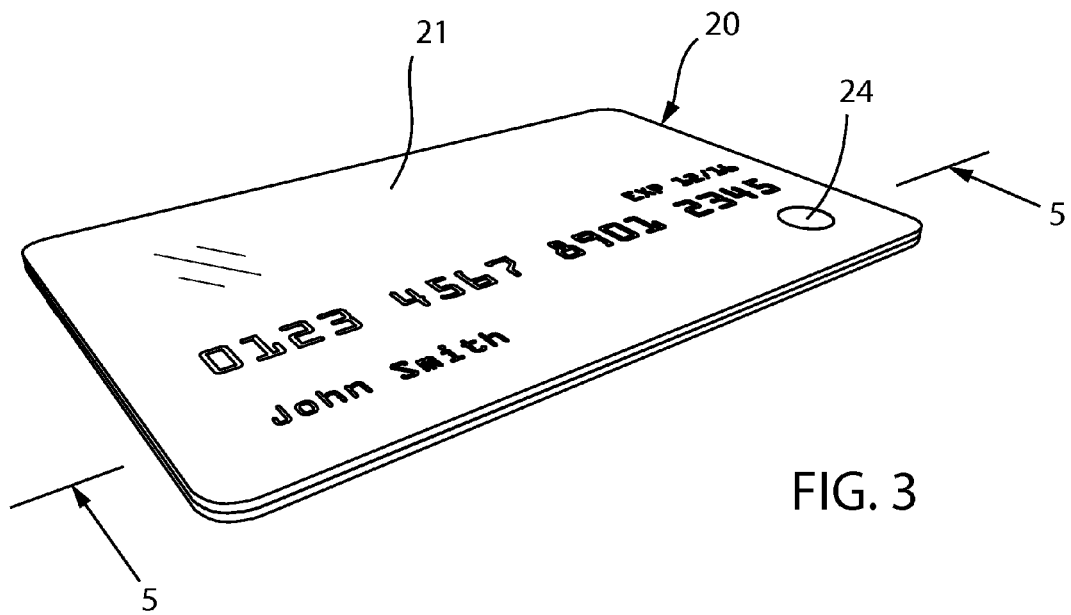
FIG. 3 is an upper perspective view of the carrier member.

A. Overview.

Turning now descriptively to the drawings, in which similar reference characters denote similar elements throughout the several views, FIGS. 1 through 18 illustrate a radio-frequency identification (RFID) remote antenna security system 10, which comprises a remote unit 30 that is attached to or near a conventional RFID reader 40. The remote unit 30 includes at least one remote contact in communication with a remote antenna 32. A carrier member 20 is provided that includes at least one contact and a radio-frequency identification chip 22 (hereinafter RFID chip) that is in communication with the at least one contact. When the contact of the carrier member 20 is physically connected to the remote contact of the remote unit 30, the radio waves received by the remote antenna 32 are communicated to the RFID chip 22 and the RFID chip 22 transmits radio waves including data from the remote antenna 32 for reading by the RFID reader 40. The drawings and discussion below illustrate the usage of an RFID chip 22, but it can be appreciated that the RFID chip 22 may be comprised of any type of tag (e.g. RFID tag, NFC tag). In addition, the drawings and the discussion below illustrate the usage of an RFID reader 40, but it can be appreciated that the RFID reader 40 may be comprised of any type of reader (e.g. RFID reader, NFC reader).

B. RFID Reader.

FIGS. 1 and 2 illustrate an exemplary radio-frequency identification reader 40 (hereinafter RFID reader) which includes at least one reader antenna 42. The RFID reader 40 may be comprised of any reader device capable of transmitting and receiving radio waves relating to a passive, semi-passive or active RFID chip 22.

C. Remote Unit.

A remote unit 30 is attached to or positioned near the RFID reader 40 as illustrated in FIGS. 1 and 2 of the drawings. The remote unit 30 may be attached to an existing or new reader 40 via various attachment systems (e.g. adhesive, fasteners). The remote unit 30 may also be incorporated into the reader 40 instead of being attached to the exterior of the reader 40. The remote unit 40 may also be shielded.

Figure 17:
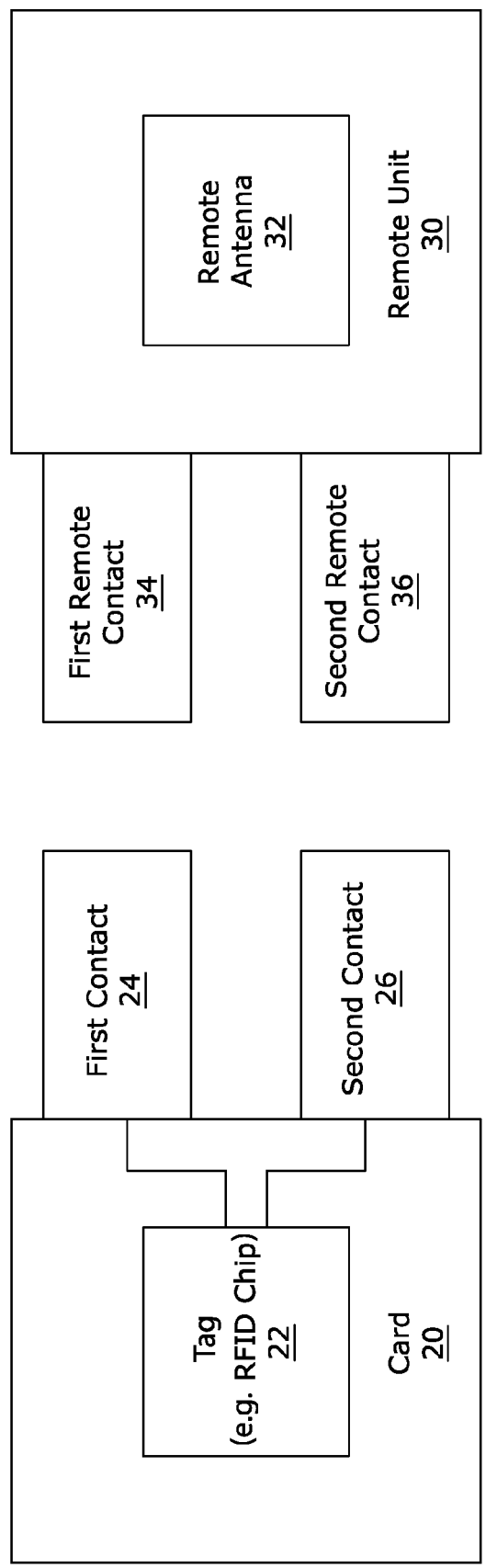
FIG. 17 is a block diagram with the contacts not in contact with one another thereby preventing an electrical circuit from being formed between the RFID chip and the remote antenna.

The remote unit 30 includes a remote antenna 32 as illustrated in FIGS. 14 and 17 of the drawings. The remote antenna 32 is comprised of an antenna capable of receiving and transmitting radio waves as used in conventional radio-frequency identification (RFID) systems. Since the RFID chip 22 within the carrier member 20 of the present invention preferably does not include an antenna for security reasons (e.g. prevent unauthorized skimming), the remote antenna 32 is utilized as a substitute and temporary antenna for the RFID chip 22 as discussed herein. The remote antenna 32 is in communication with the reader antenna 42 via radio waves as is known in the RFID industry.

The remote unit 30 includes at least one remote contact 34 in communication with the remote antenna 32. In particular, it is preferable that the remote unit 30 include a first remote contact 34 and a second remote contact 36, wherein the first remote contact 34 and the second remote contact 36 are electrically connected to the remote antenna 32 as illustrated in FIGS. 3b and 3c of the drawings. When the first remote contact 34 and the second remote contact 36 are electrically connected to the RFID chip 22 of the carrier member 20, the remote antenna 32 temporarily becomes the antenna for the RFID chip 22 during the physical and electrical contact thereof.

Figure 4:
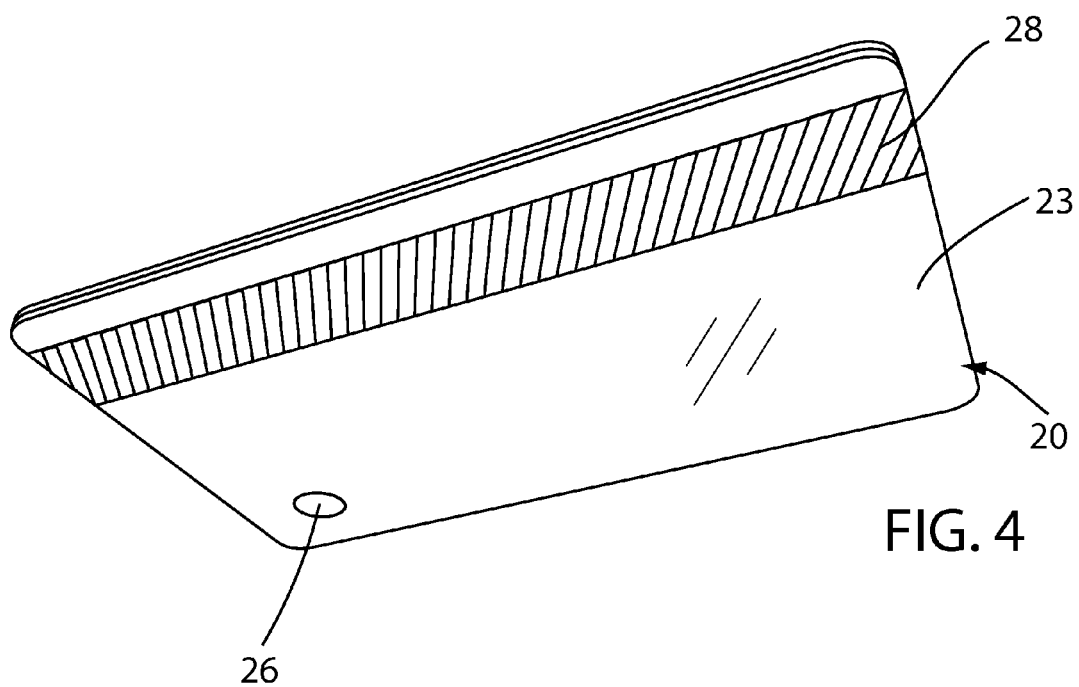
FIG. 4 is a lower perspective view of the carrier member.
Figure 18:
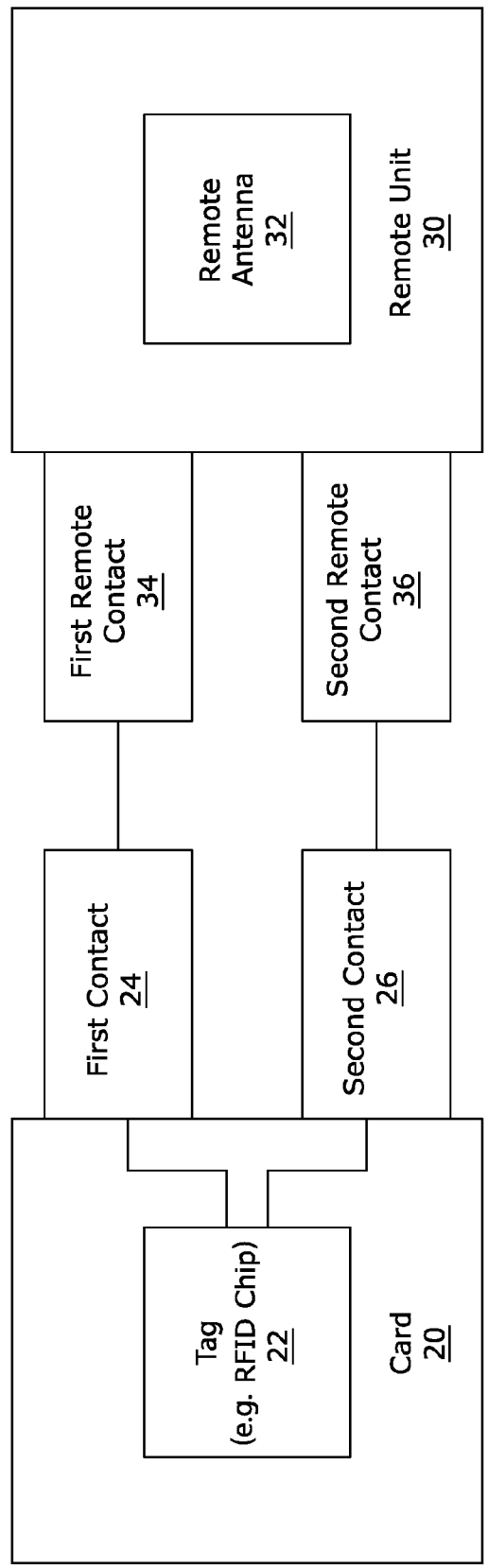
FIG. 18 is a block diagram with the contacts in electrical contact with one another thereby forming an electrical circuit between the RFID chip and the remote antenna which allows the RFID chip to wirelessly communicate with the reader antenna of the RFID reader.

The remote unit 30 preferably includes an opening 38 (e.g. a slot, aperture, passage, etc.) adapted to receive the carrier member 20 as shown in FIGS. 1, 2 and 14 of the drawings. The first remote contact 34 and the second remote contact 36 are positioned within the opening 38 and electrically communicate with the first contact 24 and the second contact 26 respectively when the carrier member 20 is positioned within the opening 38 as best illustrated in FIG. 4 of the drawings. The first remote contact 34 and the second remote contact 36 may be comprised of various electrical contacts such as spring biased contacts that are capable of electrically contacting and communicating with the first contact 24 and second contact 26 respective as illustrated in FIGS. 14 and 18 of the drawings. If the carrier member 20 is comprised of a card-type structure, the opening 38 is preferably comprised of slot-type structure as illustrated in FIGS. 1, 2 and 14. An opening 38 within the remote unit 30 is not required if the remote contacts 34, 36 are attached to an external portion of the remote unit 30.

D. Carrier Member.

The carrier member 20 may be comprised of any conventional device where valuable data is to be stored and selectively transmitted from (e.g. card, credit card, debit card, identification card, electronic key fob, mobile phone, electronic device, PDA etc.). The carrier member 20 is preferably comprised of a flat and rectangular structure forming a card-type structure as illustrated in FIG. 1 of the drawings. The carrier member 20 may also be comprised of various other shapes, structures and sizes (e.g. round, square, oval, etc.). The carrier member 20 may or may not include a magnetic strip 28 that stores various types of electronic data as is well known with conventional credit cards.

Figure 5:
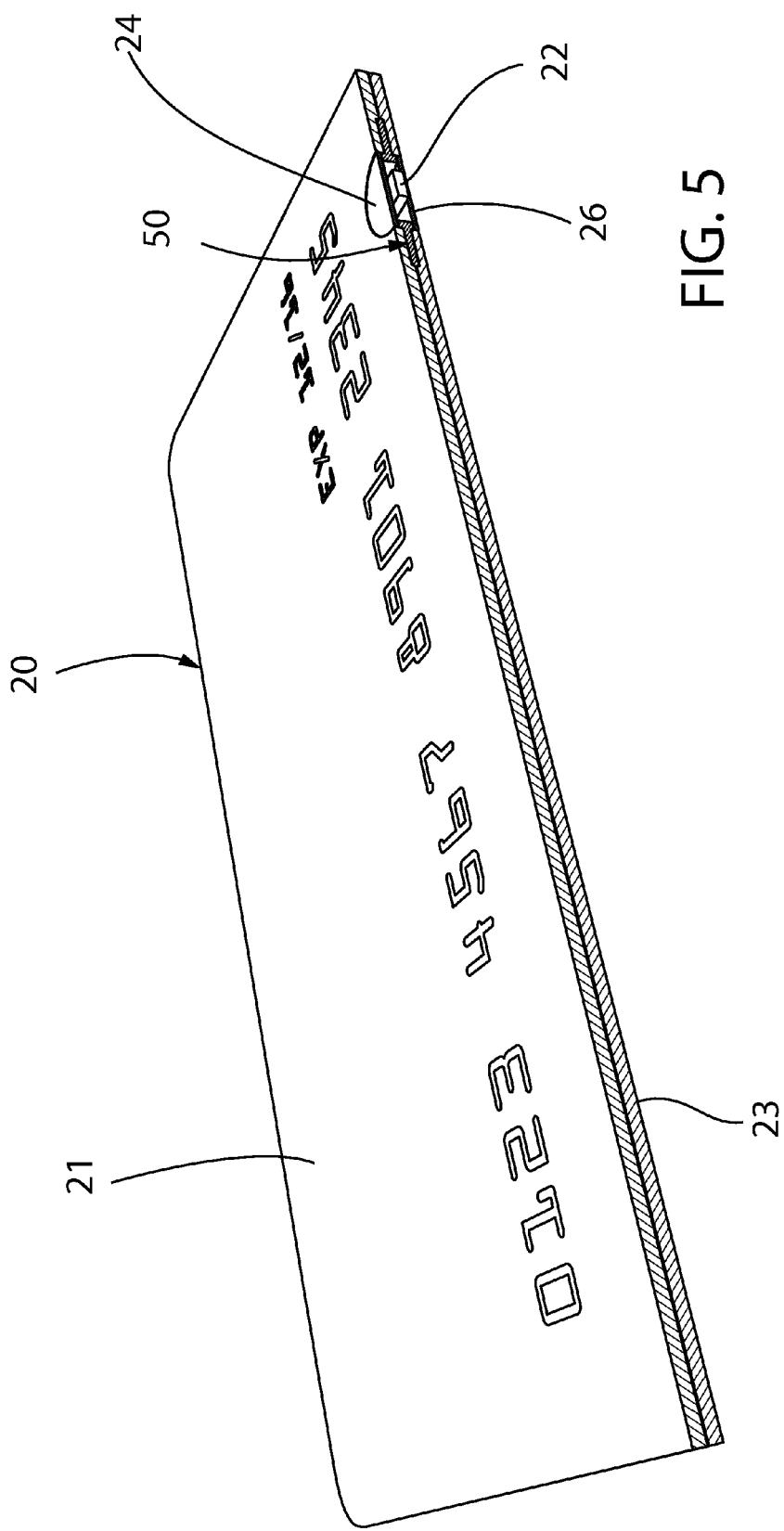
FIG. 5 is a cross sectional view taken along line 5-5 of FIG. 3.

The carrier member 20 includes an RFID chip 22 as illustrated in FIG. 5 of the drawings. While the RFID chip 22 may have an antenna, it is preferable that the RFID chip 22 does not include an antenna to prevent unauthorized access of RFID chip 22. The RFID chip 22 is preferably comprised of a passive or semi-passive RFID system, however the RFID chip 22 may be comprised of an active RFID system. The RFID chip 22 may also be comprised of a near field communications (NFC) system utilized in mobile electronic devices such as cellphones. The RFID chip 22 may be comprised of any wireless chip technology capable of transmitting and receiving data wirelessly.

The carrier member 20 includes at least one contact 24 in electrical communication with the RFID chip 22. The RFID chip 22 is adapted so that the RFID chip 22 is not activated or capable of transmitting data unless the at least one contact 24 is physically connected to the at least one remote contact 34.

It is preferable that the carrier member 20 include a first contact 24 and a second contact 26 as illustrated in FIGS. 3 through 15 of the drawings. The first contact 24 is adapted to physically contact the first remote contact 34 and wherein the second contact 26 is adapted to physically contact the second remote contact 36 when the carrier member 20 is positioned in a desired location on the remote unit 30. When the first contact 24 is in communication with the first remote contact 34 and when the second contact 26 is in communication with the second remote contact 36, an electrical circuit is formed between the remote antenna 32 and the remote antenna 32 that allows for the reception and transmission of radio waves as is known in the RFID industry. Hence, when the contacts 24, 26 are in direct contact with the remote contacts 34, 36, a direct connection is formed between the remote contacts 24, 26 and the remote antenna 32.

As illustrate in FIGS. 1, 3 through 14 of the drawings, the first contact 24 and the second contact 26 are preferably on opposing sides of the carrier member 20. The carrier member is further preferably comprised of a first portion 21 and a second portion 23, wherein the respective interior surfaces of the first portion 21 and the second portion 23 are connected together (e.g. via adhesive, fasteners, etc.). The first portion 21 and the second portion 23 are each preferably comprised of the same shape and same thickness to form a conventional credit card structure when attached together as illustrated in FIGS. 1 through 4 of the drawings.

Figure 6:
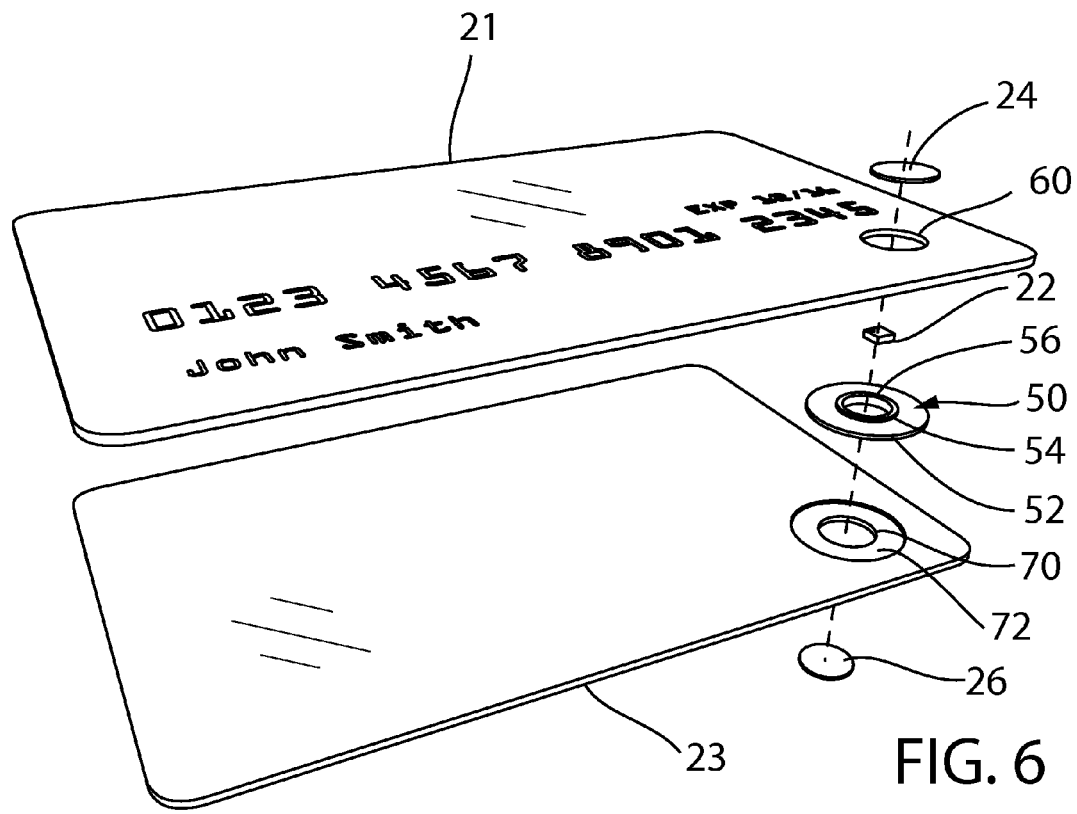
FIG. 6 is an exploded upper perspective view of the carrier member.
Figure 7:
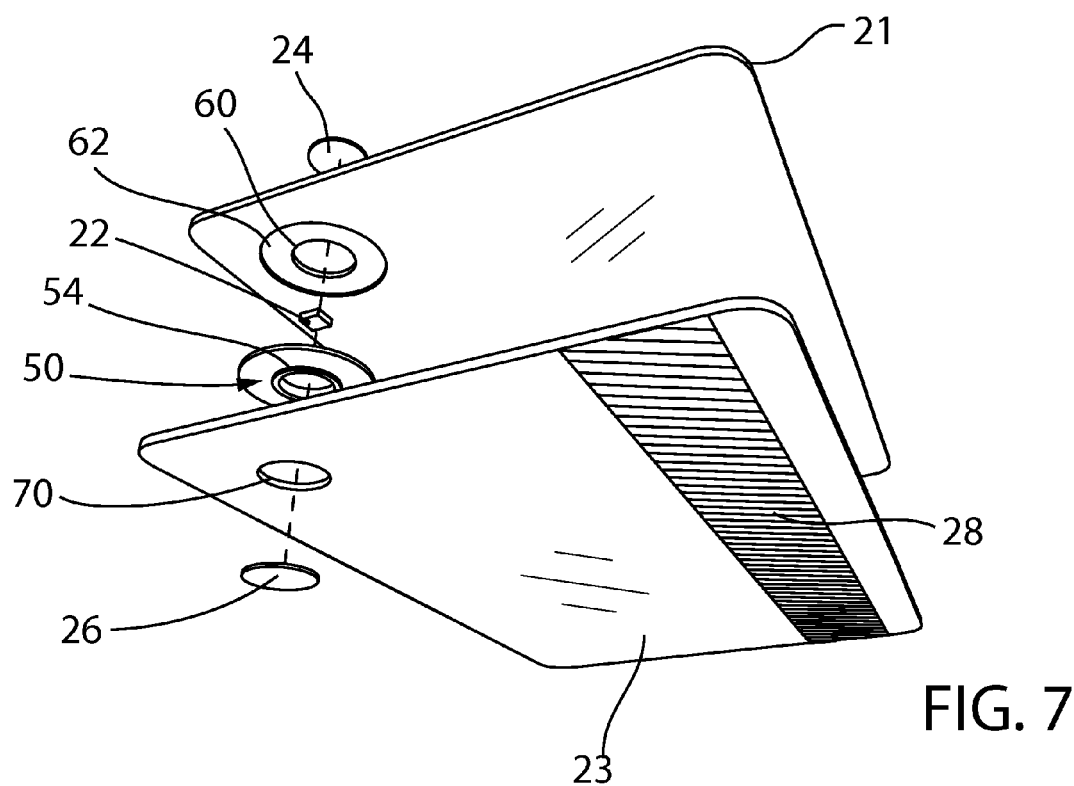
FIG. 7 is an exploded lower perspective view of the carrier member.

The first portion 21 includes a first opening 60 that is surrounded by a first recessed portion 62 within the interior surface of the first portion 21 as best illustrated in FIG. 7 of the drawings. The second portion 23 includes a second opening 70 that is surrounded by a second recessed portion 72 within the interior surface of the second portion 23 as best illustrated in FIG. 6 of the drawings. The first opening 60 is preferably concentrically aligned with the second opening 70 though not required. In addition, the first opening 60 is preferably the same shape (e.g. circular, square, rectangular) and size as the second opening 70 though not required.

Figure 13:
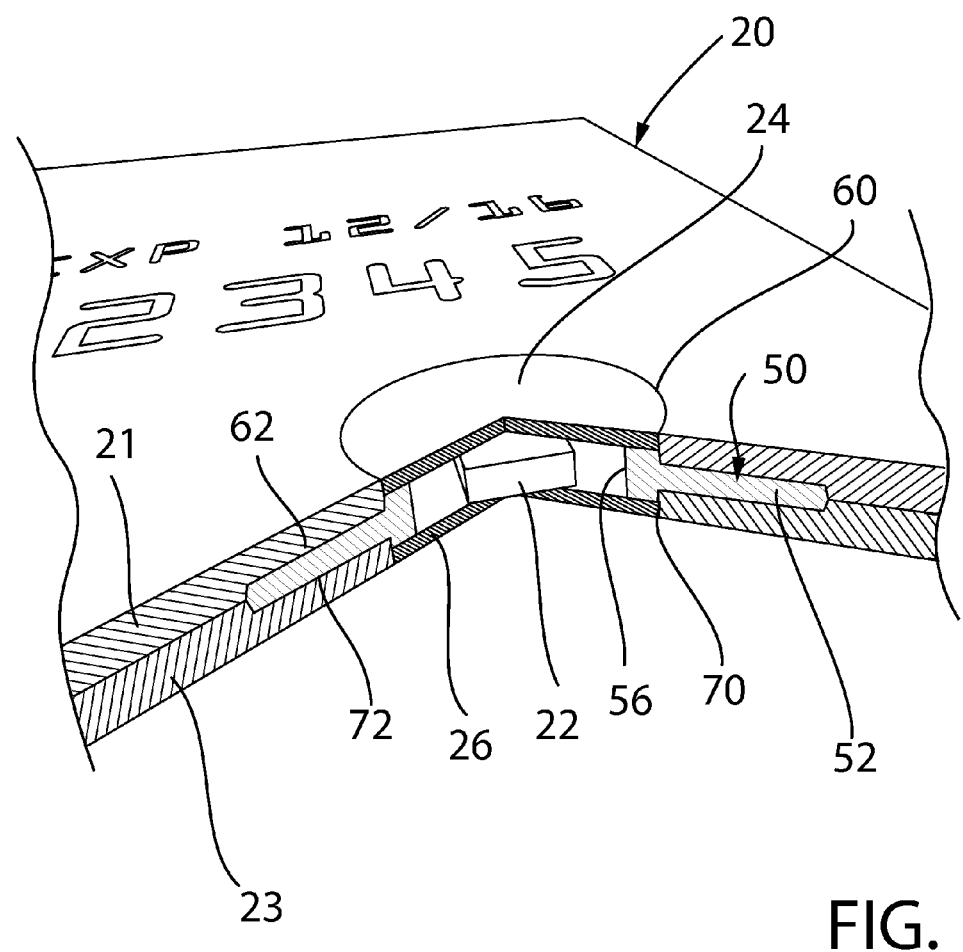
FIG. 13 is a magnified partial cutaway view of the carrier member showing the first and second contact.
Figure 16:
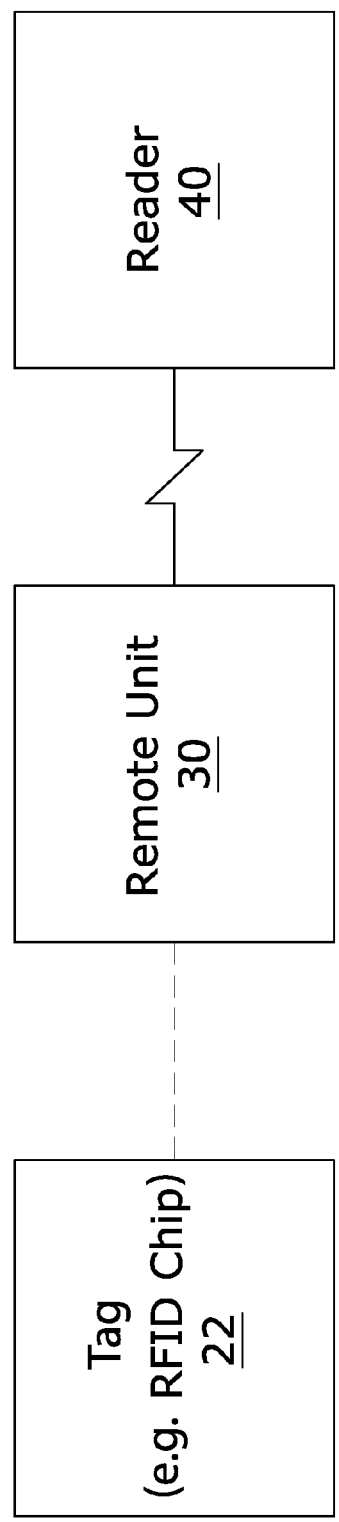
FIG. 16 is a block diagram of the communications between the RFID chip, the remote unit and the RFID reader.

A support member 50 is adapted to fit between the first portion 21 and the second portion 23 of the carrier member to house and protect the RFID chip 22 as illustrated in FIGS. 12 through 15 of the drawings. The support member 50 is comprised of a tubular portion 54 having a receiver opening 56 that is concentrically aligned with and positioned inside of the openings 60, 70 as illustrated in FIG. 13 of the drawings. The receiver opening 56 within the support member 50 receives and protects the tag 22. The support member further includes a flanged portion 52 that extends outwardly from the tubular portion 54 wherein the flanged portion 52 is received within the recessed portions 62, 72 when the first portion 21 of the carrier member 20 is attached to the second portion 23 of the carrier member. The tubular portion 54 and the flanged portion 52 preferably each have a circular shape, however other shapes may be utilized.

The first contact 24 and the second contact 26 are attached to the carrier member with an adhesive, epoxy, fastener or other securing device. The first contact 24 and the second contact 26 are electrically connected to the tag 22 (e.g. RFID chip) by either electrical wires or by the contacts 24, 26 directly contacting opposing sides of the tag 22 wherein the opposing sides of the tag 22 are comprised of electrical contacts that are electrically connected to the integrated circuit of the tag 22. The exterior surface of the contacts 24, 26 preferably are flush with the respective exterior surface of the carrier member 20 as best illustrated in FIG. 15 of the drawings.

Figure 8:
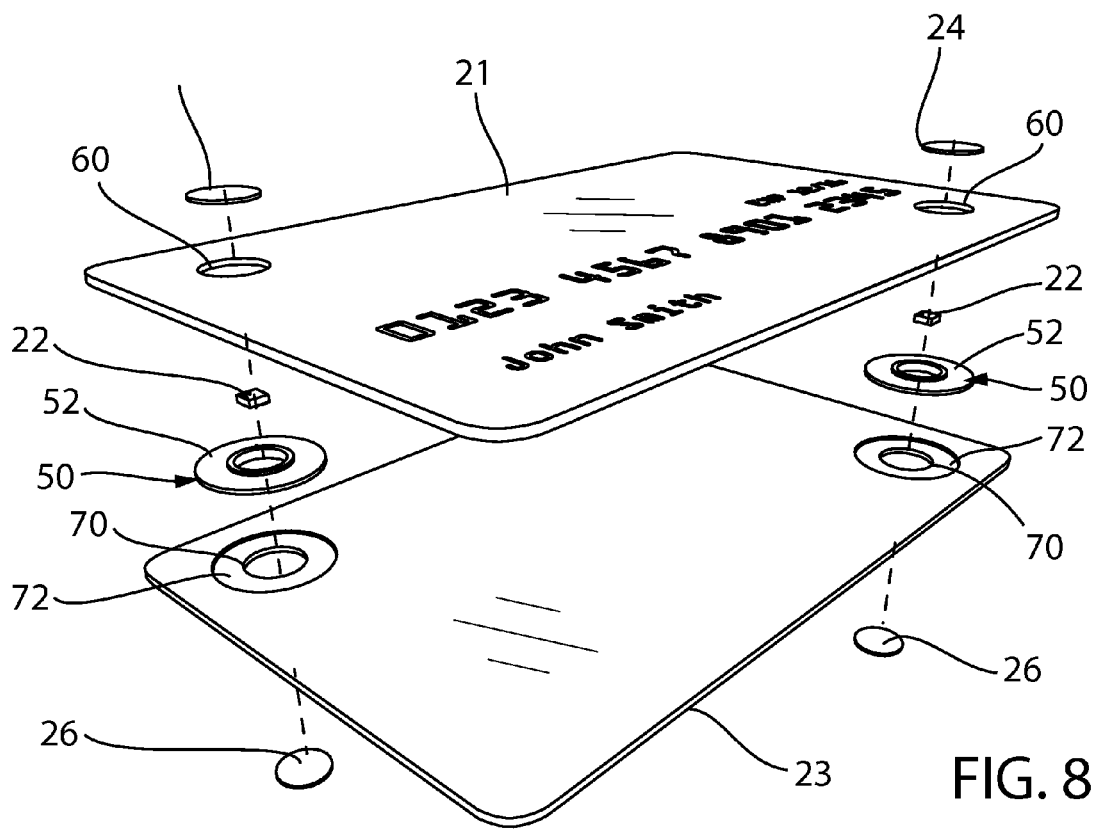
FIG. 8 is an exploded upper perspective view of an alternative embodiment of the carrier member having a plurality of RFID chips.
Figure 9:
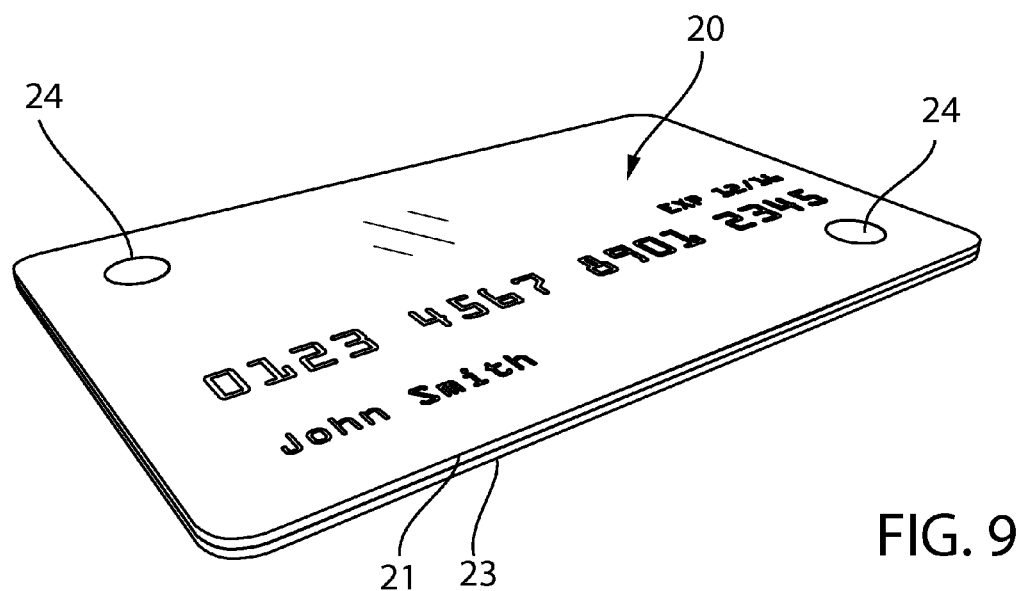
FIG. 9 is an upper perspective view of the alternative embodiment of the carrier member having a plurality of RFID chips.
Figure 10:
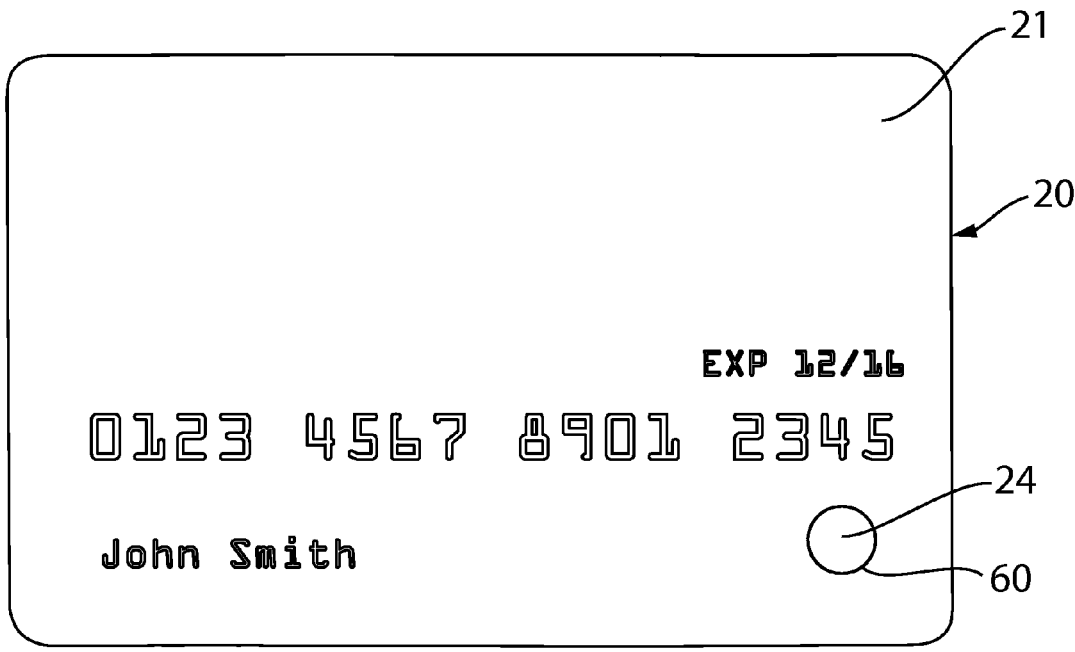
FIG. 10 is a top view of the carrier member.
Figure 11:
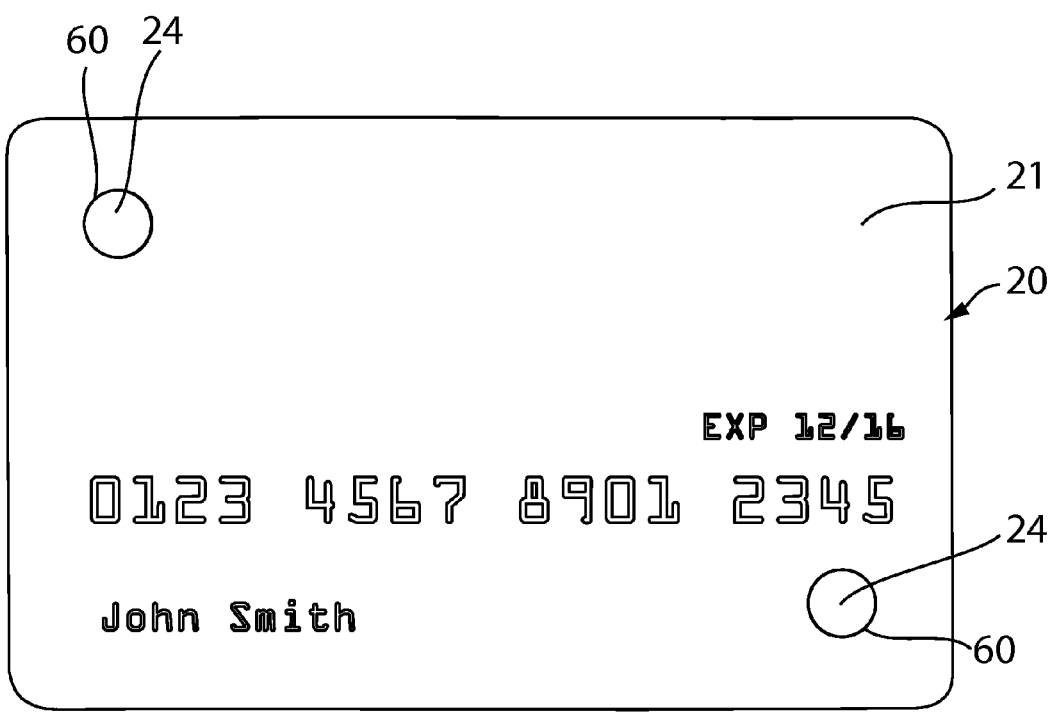
FIG. 11 is a top view of the alternative embodiment of the carrier member.
Figure 12:
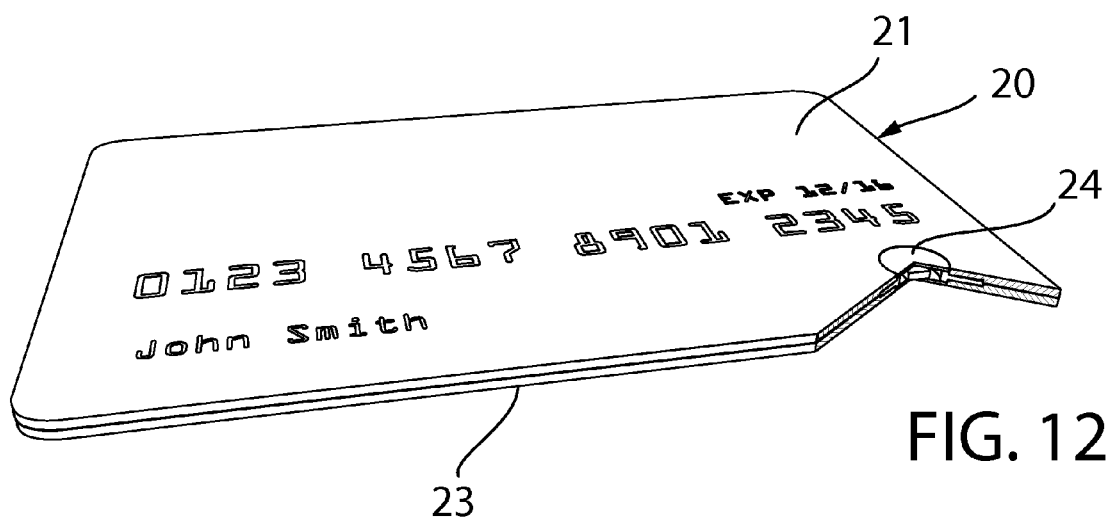
FIG. 12 is a partial cutaway view of the carrier member showing the first and second contact.

FIGS. 8 and 11 illustrate an alternative embodiment wherein the carrier member 20 includes a plurality of first contacts 24, a plurality of second contacts 26, a plurality of tags 22 and a plurality of support members 50 in different positions upon the carrier member 20 (e.g. in opposing corner portions) allowing a user to use a first tag 22 for a first type of credit card and a second tag 22 for a second type of credit card by simply inserting a first end or a second end of the carrier member 20 into the remote unit 30.

E. Operation of Preferred Embodiment.

In use, the tag 22 (e.g. RFID chip or NFC chip) of the carrier member 20 preferably does not include its own antenna (the tag 22 preferably has no antenna at all) and hence is not capable of receiving radio waves or transmitting radio waves. Hence, the tag 22 within the carrier member 20 is preferably comprised of only an integrated circuit with no antenna. The remote antenna 32 of the remote unit 30 becomes the antenna for the RFID chip 22 when the contacts 24, 26 are physically connected to the remote contacts 34, 36 as illustrated in FIGS. 2, 14 and 18 of the drawings. The radio waves transmitted by the RFID reader 40 are received by the remote antenna 32 and then electrically communicated to the RFID chip 22 when the remote antenna 32 is electrically connected to the RFID chip 22. The radio waves received by the remote antenna 32 are used to provide electrical power to the RFID chip 22 and thereby activates the RFID chip 22. The RFID chip 22 transmits radio waves including data (e.g. credit card data, personal data, etc.) from the remote antenna 32 for reading by the RFID reader 40 when the contacts 24, 26 are electrically connected to the remote contacts 34, 36 of the remote unit 30 as shown in FIGS. 2, 3c and 4 of the drawings. After the data has been transmitted to the RFID reader 40, the user then removes the carrier member 20 from the remote unit 30 thereby deactivating the RFID chip 22 within the carrier member 20 making the RFID chip 22 impossible to access by an unauthorized device or individual.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A remote antenna system, comprising:
a remote unit, wherein said remote unit includes a remote antenna, a first remote contact and a second remote contact;
wherein said first remote contact and said second remote contact are in communication with said remote antenna; and
a carrier member having a flat structure with a first side and a second side, wherein said second side is opposite of said first side;
wherein said carrier member includes an RFID chip, a first contact and a second contact, wherein said first contact and said second contact are in communication with said RFID chip;
wherein said first contact is positioned on said first side of said carrier member and wherein said second contact is positioned on said second side of said carrier member;
wherein said RFID chip is adapted so that said RFID chip is not activated unless said first contact and said second contact are physically connected to said first remote contact and said second remote contact respectively.

2. The remote antenna system of claim 1, wherein said first contact is concentrically positioned with respect to said second contact.

3. The remote antenna system of claim 1, wherein said first contact and said second contact have a circular shape.

4. The remote antenna system of claim 1, wherein when said first remote contact and said second remote contact are physically connected to said first contact and said second contact, said remote antenna temporarily becomes a temporary antenna for said RFID chip during the physical connection period.

5. The remote antenna system of claim 4, wherein radio waves received by said remote antenna are communicated to said RFID chip when said first contact and said second contact are physically connected to said first remote contact and said second remote contact respectively, and wherein said RFID chip transmits radio waves including data from said remote antenna for reading by an RFID reader when said first contact and said second contact are physically connected to said first remote contact and said second remote contact respectively.

6. The remote antenna system of claim 1, wherein said RFID chip does not include an antenna.

7. The remote antenna system of claim 1, wherein when said first contact is in communication with said first remote contact and when said second contact is in communication with said second remote contact, an electrical circuit is formed with said remote antenna.

8. The remote antenna system of claim 1, wherein a first exterior surface of said first contact is flush with said first side and wherein a second exterior surface of said second contact is flush with said second side.

9. The remote antenna system of claim 1, including a support member attached to and positioned within said carrier member, wherein said support member includes an interior opening and wherein said RFID chip is positioned within said interior opening.

10. The remote antenna system of claim 9, wherein said support member includes a receiver opening that is concentrically aligned with a first opening in said first side of said carrier member and a second opening in said second side of said carrier member.

11. The remote antenna system of claim 10, wherein said first contact is positioned within said first opening and wherein said second contact is positioned within said second opening.

12. The remote antenna system of claim 10, wherein said carrier member is comprised of a first portion defining said first side and a second portion defining said second side, wherein said first portion is attached to said second portion.

13. The remote antenna system of claim 12, wherein said support member is comprised of a tubular portion and a flanged portion extending outwardly from said tubular portion, wherein said flanged portion is positioned between said first portion and said second portion of said carrier member.

14. The remote antenna system of claim 13, wherein said RFID chip is positioned within said tubular portion.

15. The remote antenna system of claim 13, wherein said first contact is positioned adjacent to a first end of said tubular portion and wherein said second contact is positioned adjacent to a second end of said tubular portion, wherein said first end is opposite of said second end.

16. The remote antenna system of claim 1, wherein said first remote contact and said second remote contact face one another.

17. The remote antenna system of claim 1, wherein said remote unit includes an opening having a first inner sidewall and a second inner sidewall that face one another, wherein said opening removably receives said carrier member, and wherein said first remote contact is positioned upon said first inner sidewall and wherein said second remote contact is positioned upon said second inner sidewall.

18. The remote antenna system of claim 17, wherein said first remote contact directly contacts said first contact and said second remote contact directly contacts said second contact when said carrier member is positioned within said opening.

19. The remote antenna system of claim 17, wherein said first remote contact and/or said second remote contact are comprised of spring biased contacts capable of electrically contacting and communicating with said first contact and said second contact respectively.

20. The remote antenna system of claim 1, wherein said first contact and said second contact are each comprised of circular discs.

* * * * *